2 Sheets--Sheet 1.

GREELY & BUXTON.

Mower.

No. 3,947.

Reissued May 3, 1870.

Witnesses:
Geo Bailey
A. E. Peirce.

Inventors.
John P. Greely
Lewis W. Buxton
By their Attorney
Thos H. Dodge.

N. PETERS, Photo-Lithographer, Washington, D. C.

2 Sheets—Sheet 2.

GREELY & BUXTON.

Mower.

No. 3,947.

Reissued May 3, 1870.

Witnesses:
W. Bailey
A. E. Pierce

Inventors:
John P. Greely
Lewis W. Buxton
By their Attorney
Thos. H. Dodge

N. PETERS, Photo-Lithographer, Washington, D. C.

United States Patent Office.

JOHN P. GREELEY, OF BOSTON, AND LEVI W. BUXTON, OF LYNN, FOR THEMSELVES, AND THOMAS H. DODGE, ASSIGNEE OF ONE-THIRD INTEREST, OF WORCESTER, MASSACHUSETTS.

*Letters Patent No.* 39,286, *dated July* 21, 1863; *reissue No.* 3,947, *dated May* 3, 1870.

IMPROVEMENT IN MOWING-MACHINES.

The Schedule referred to in these Letters Patent and making part of the same.

*To all whom it may concern:*

Be it known that we, JOHN P. GREELEY, formerly of Nashua, in the county of Hillsborough and State of New Hampshire, but now of Boston, in the county of Suffolk and Commonwealth of Massachusetts, and LEVI W. BUXTON, formerly of said Nashua, but now of Lynn, in the county of Essex and State of Massachusetts, have invented an Improved Mowing-Machine; and we do hereby declare that the following is a full, clear, and exact description of the same, reference being had to the accompanying drawings forming a part of this specification, in which—

Figure 4 represents a detached part, and shows a side view of the elevating windlass.

Figure 1:
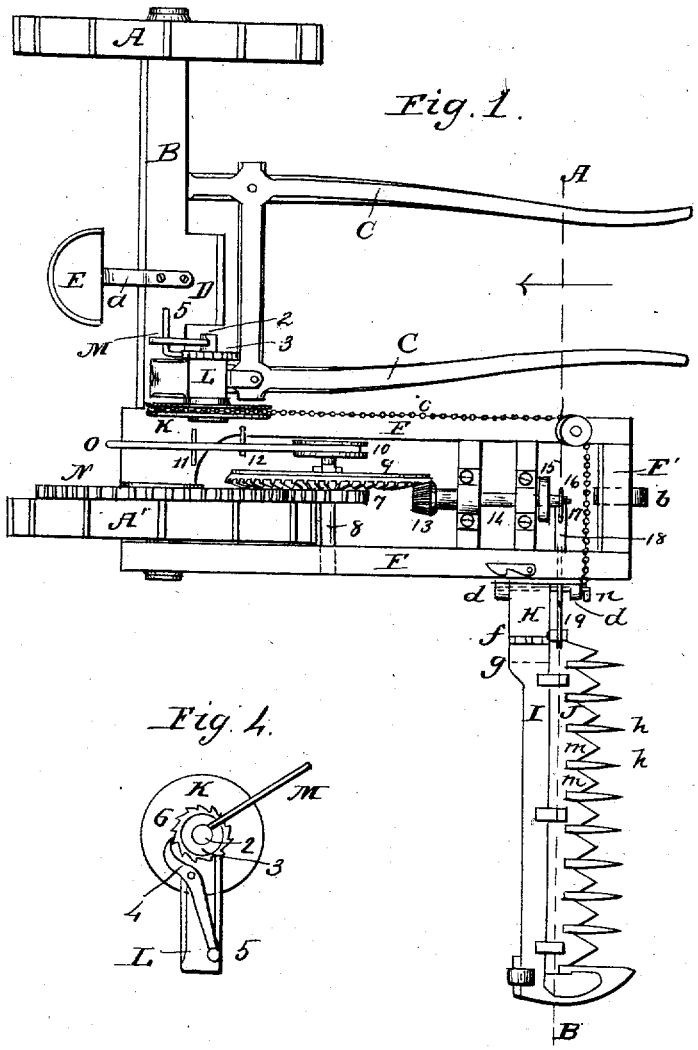
Figure 1 represents a top or plan view of our improved mowing-machine.
Figure 2:
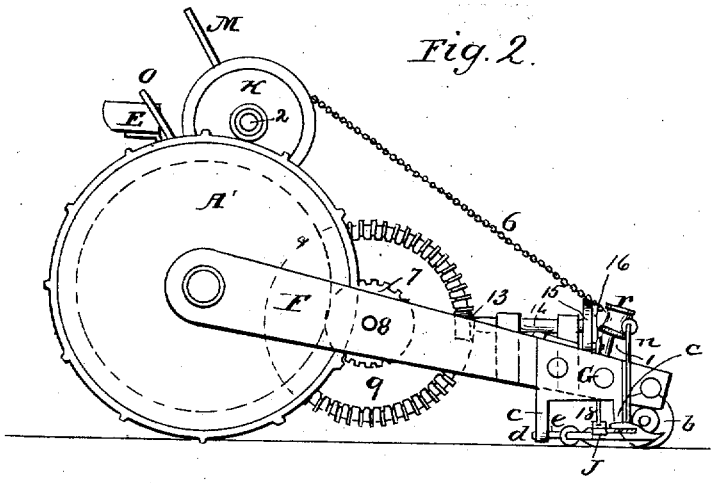
Figure 2 represents a side view of the same.

To enable those skilled in the art to which our invention belongs to make and use the same we will proceed to describe it more in detail.

The nature of our invention consists:

First, in the arrangement with the frame which supports the shafts or draft device, of a hinged finger-beam and forwardly-projecting vibrating frame for supporting the hinged finger-beam, substantially as hereafter described.

Secondly, in the combination with a hinged vibrating frame and hinged finger-beam, of a bell-crank for operating the cutter-bar, for the purposes hereafter stated.

Thirdly, in the combination with a vibrating frame in a mowing-machine, of a hanger piece, hinged finger-beam, and intermediate hinged cramping and elevating piece.

Fourthly, in the combination with the vibrating frame, hinged finger-beam, and windlass or wheel, of the elevating cord and guide-pulley, substantially as hereafter described.

Fifthly, in the arrangement between the bell-crank, which is supported upon the vibrating frame, and the cutter-bar, which is supported upon the hinged finger-beam, of an intermediate link or hinged connecting piece for the purposes hereafter stated.

Sixthly, in the combination with a vibrating frame upon which is arranged the bell-crank, a hinged finger-beam, and a hinged cramping and elevated piece, of an elevating lever and chain.

Seventhly, in a hinged cramping and elevating piece, substantially as and for the purposes hereafter stated.

In the drawings—

A A′ are the main supporting wheels which turn upon journals projecting from the narrow frame-piece B to which the rear end of the shafts C C are securely fastened.

From the frame-piece B projects forward a foot-board or piece, D, while to the top of the frame B, and in rear of said foot-piece, is secured spring *a*, for supporting the driver's seat E, which extends back in rear of the frame-piece, to which the shafts are attached, so that when the driver is seated upon the machine his weight will tend to counterbalance the weight of the shafts.

A forwardly-projecting vibrating frame, F, is attached to the frame-piece B by a hinged connection, so that the forward end of said frame F can rise and fall freely, to conform to the inequalities of the ground over which it is drawn.

The inner side piece of the vibrating frame F is supported and turns upon the end of the journal of the main driving-wheel A, the two pieces of said frame being united in front by the cross-piece F′, which is supported by a small roll, *b*.

Figure 3:
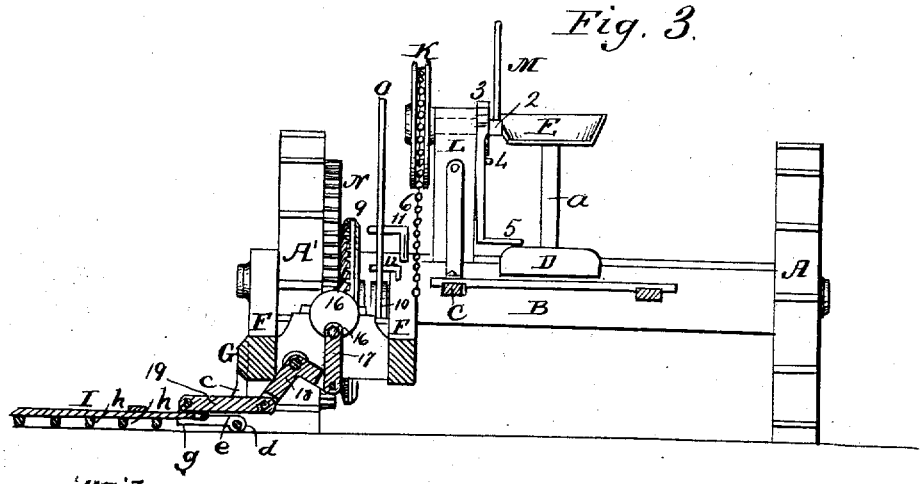
Figure 3 represents a section on line A B, fig. 1.

To the inside of the front end of the vibrating frame F is fastened a hanger-piece, G, having two downwardly-projecting legs, *c c*, provided with ear-pieces, *d d*, at their lower ends, in which turns a journal or spindle, *e*, to which is fastened one end of the intermediate cramping and finger-beam elevating piece H, while upon the upper side of said piece, and near the other end thereof, are ear-pieces, *f*, to which the heel end of the finger-beam I is hinged, so that the projecting part *g* of the piece H will extend under and past said hinge and under the heel end of the finger-beam, as indicated in full lines, fig. 3, of the drawings, and dotted lines, fig. 1.

By this arrangement, the outer end of the finger-beam will be prevented from falling below a certain point, while, when the outer end of the intermediate piece H is turned up, it will cramp or stiffen the joint of the finger-beam as soon as its projecting end *g* strikes against the under side of the heel end of the finger-beam.

The finger-beam I is provided with guards, *h*, through which works the cutter-bar J, provided with cutters, *m*, which may be made in the usual manner.

To the front end of the journal *e* is secured an upright arm, *n*, to the top of which is fastened the cord or chain *o*, which passes through a guide and then around the friction-pulley *p*, which turns upon a standard, 1, upon the top of the frame F.

Chain *o* extends back, and is wound about and fastened to a windlass or wheel K, fast on the journal 2, which extends through and turns on the standard L on the top of the frame-piece B, and is provided with a ratchet-wheel, 3, and a hand-lever, M, upon its inner end, whereby the driver from his seat E can wind up chain *o* and raise the outer end of the finger-beam until arm-lever *n* strikes against the inside of the frame F, when he can raise the entire finger-beam and the front end of frame F up from the ground to pass obstructions, mown grass, or from one field to another.

Frame F and the finger-beam I can be retained in elevated positions after they have been raised as before explained, by allowing the pivoted pawl 4, to catch into the ratchet-wheel 3.

When the driver wishes to depress or drop the finger-beam to the ground, he takes hold of lever M, and then presses his foot against the projecting end S of the pawl 4, so as to throw its upper end out free from the ratchet-teeth 6, after which he can easily and quickly lower the finger-beam by simply allowing the wheel K to turn back and unwind the chain *o*.

A spur-gear, N, is secured to the inside of the wheel A′ to mesh into a small spur-gear, 7, on the journal 8, supported and turning in bearings in the frame F.

A bevel-gear, 9, is fitted to run loose on shaft 8, while a clutch-pulley, 10, is fitted to slide on and turn with said shaft, and which clutch-pulley can be thrown into clutch with gear 9, by means of a clutch-lever O, and which is properly supported by standards 11 and 12.

A small bevel-gear, 13, is fastened to the rear end of the crank-shaft 14, which is supported and turns in bearings upon the cross-pieces of the vibratory frame F.

To the front end of the crank-shaft 14 is fastened a balance-wheel, 15, from which projects a wrist-pin, 16, to which is journaled one end of the pitman 17, the other end of the pitman being journaled to one end of a bell-crank, 18, the other end of the bell-crank being journaled to the inner end of a link or connecting-piece 19, the outer end of which is journaled to the heel end of the cutter-bar.

It will thus be seen that when the machine is drawn forward and shaft or journal 8 is clutched to gear 9 a rapid rotary motion will be imparted to shaft 14, and a reciprocating motion will be imparted to the cutter-bar through the instrumentality of the bell-crank and its connections.

The bell-crank, being journaled upon the vibrating frame F, to which the finger-beam is hinged, rises and falls with the heel end thereof, while, when the outer end of the finger-beam is raised or depressed, the link or connecting-piece 19 being hinged at both ends, yields, and thus prevents all binding of the cutter-bar.

It will also be observed that the reciprocating motion will be imparted to the cutter-bar without binding or cramping the operating mechanism, as well when the outer end of the finger-beam is elevated or turned up, as when it rests upon the ground in a horizontal position.

This is a great advantage in a mowing-machine and obviates one of the most serious objections to the use of hinged finger-beam machines, in which the cutter-bar is operated from the crank-shaft by a single pitman or connection, as will be readily understood by those accustomed to the use of mowing-machines.

By arranging the vibratory frame F so as to project forward of the inside supporting-wheel and alongside the shafts or thills, the driver, while sitting on his seat, can not only control the finger-beam and raise it radially and at its outer end, but he can also raise it at both ends, the power to effect which being applied by him to lever M.

Such an arrangement also enables the driver to witness the operation of the cutting apparatus while at the same time directing the team, thereby enabling him to detect, avoid, and pass obstructions in the path of the finger-beam, without undue twisting or straining of his arms and body By giving the frame F a support upon the end of the journal, upon the outside of the driving-wheel A′, the strength of the vibratory frame is greatly increased and relieved in a great measure from the back-twisting strain incident to the draft of the finger-beam, which would otherwise come upon said frame.

The construction of the machine is such that the cutting apparatus adapts itself readily to the uneven surface of the ground over which it is drawn.

Having described our improved mowing-machine,

What we claim therein as new and of our invention, and desire to secure by Letters Patent, is—

1. The arrangement, with the frame which supports the shafts or draft device, of a hinged finger-beam, and forwardly projecting narrow vibrating frame for supporting the hinged finger-beam, substantially as described.

2. The combination with a hinged vibrating frame and hinged finger-beam, of a bell-crank for operating the cutter-bar, for the purposes stated.

3. The combination with a vibrating frame, in a mowing-machine, of a hanger-piece, hinged finger-beam, and intermediate hinged cramping and elevating piece.

4. The combination with the vibrating frame, hinged finger-beam, and windlass or wheel, of the elevating cord and guide-pulley, substantially as described.

5. The arrangement between the bell-crank, which is supported upon the vibrating frame, and the cutter-bar, which is supported upon the hinged finger-beam, of an intermediate link or hinged connecting-piece, for the purposes stated.

6. The combination with a vibrating frame upon which is arranged the bell-crank, a hinged finger-beam and a hinged cramping and elevating piece, of an elevating lever and chain.

7. The hinged cramping and elevating-piece H, substantially as and for the purposes set forth.

JOHN P. GREELEY.
LEVI W. BUXTON.

Witnesses to J. P. GREELEY:
NATHAN MORSE,
WM. E. L. DILLAWAY.
Witnesses to L. W. BUXTON:
EZRA BAKER,
E. D. BAKER.